United States Patent [19]

Bentley et al.

[11] 3,717,290
[45] Feb. 20, 1973

[54] MANUFACTURE OF GLASS SHEETS HAVING PREDETERMINED OUTLINE SHAPES

[75] Inventors: William Bentley; John D. Kellar, both of Oshawa, Ontario, Canada

[73] Assignee: PPG Industries, Inc., Pittsburgh, Pa.

[22] Filed: Sept. 17, 1971

[21] Appl. No.: 181,450

[30] Foreign Application Priority Data

May 13, 1971 Canada..................................112907

[52] U.S. Cl. ......................225/2, 225/96.5, 225/97
[51] Int. Cl..............................B26d 3/08, B26f 3/00
[58] Field of Search...........................225/2, 96.5, 97

[56] References Cited

UNITED STATES PATENTS

| | | | |
|---|---|---|---|
| 3,474,944 | 10/1969 | Chatelain et al. | 225/2 |
| 3,486,673 | 12/1969 | Madge | 225/96.5 X |
| 3,532,259 | 10/1970 | Augustin et al. | 225/97 X |
| 3,543,978 | 12/1970 | Feillet | 225/96.5 X |

Primary Examiner—Frank T. Yost
Attorney—Cushman, Darby & Cushman

[57] ABSTRACT

Glass sheets are scored and broken out in sequence on a conveyor line which includes a loading station for receiving rectangular sheets of glass of one predetermined outline size from a first storage means or pallet or from a second storage pallet containing glass of a different predetermined size. Just beyond the loading station are serially arranged first and second scoring stations and beyond these are located serially arranged first and second glass breakout stations. The first scoring and breakout stations are arranged to score to a first outline pattern and breakout, respectively, glass from the first pallet while the second scoring and breakout stations are arranged to score to a second outline pattern and breakout, respectively, glass received from the second pallet. This arrangement permits very rapid changeover from one pattern to another; pattern changes and maintenance can be effected on one set of stations, e.g., the "first" scoring and breakout stations while the other set of stations remains in operation.

9 Claims, 11 Drawing Figures

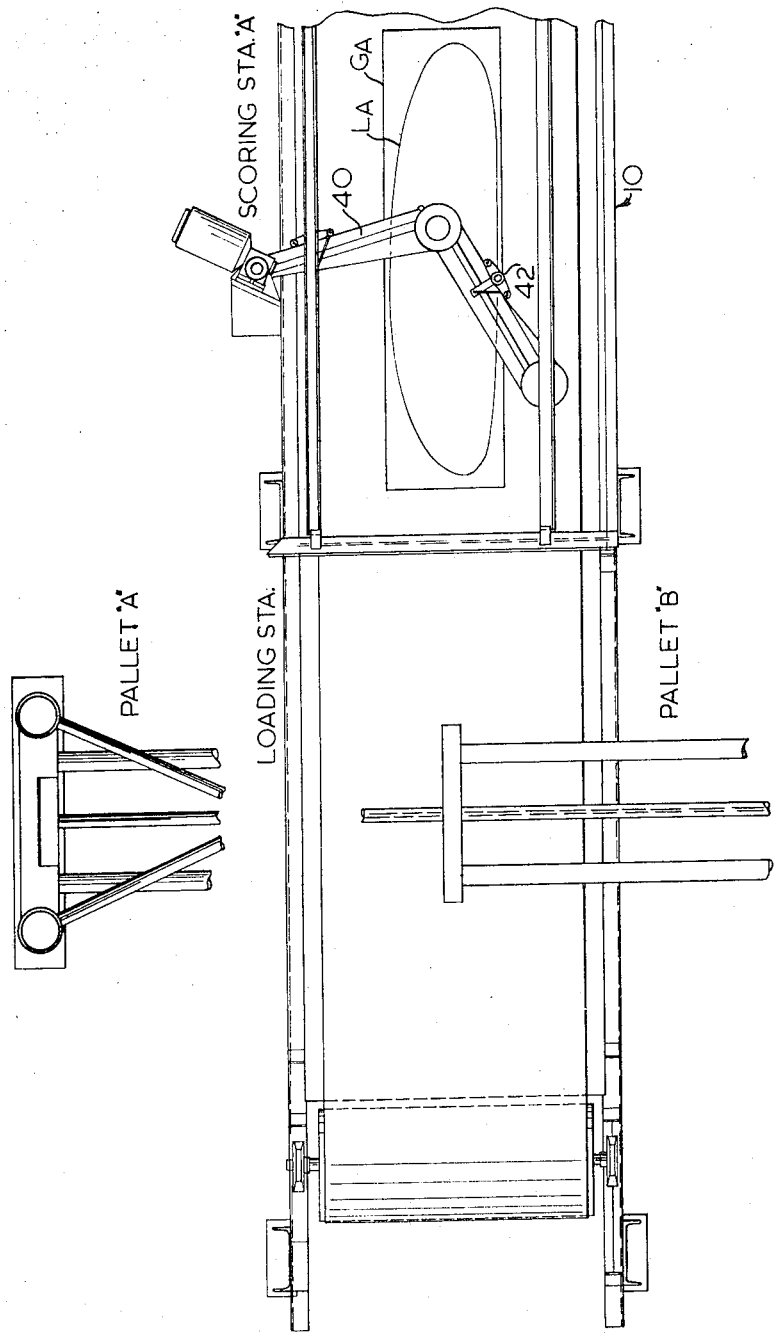

MANUFACTURE OF GLASS SHEETS HAVING PREDETERMINED OUTLINE SHAPES

BACKGROUND OF THE INVENTION

1. Field of the Invention

This invention relates to the manufacture of glass sheets having predetermined outline shapes such as would be used, for example, in the manufacture of glass windshield assemblies for automobiles.

2. Prior Art

In the manufacture of glass shapes for windshields etc., it is well known to apply a score line conforming to a desired outline shape to the surface of a rectangular sheet of glass. After scoring the sheet, it is also very well known to apply forces to the sheet so as to cause the marginal edges of the sheet lying outside of the score line to be broken off.

For many years now the above described operations have been carried out automatically on a conveyor line. The rectangular sheets of glass are automatically positioned on the inlet end of the conveyor belt, and the conveyor belt automatically indexed to bring the sheets sequentially to a scoring station and thence to a breakout station wherein the marginal edges of the glass lying outside the score line are broken off. The glass is then advanced to a further station where the sheet having a predetermined outline shape is lifted away from the waste marginal portions of the glass. The glass sheet, having a predetermined outline determined by the final configuration required for the windshield etc. is then passed through a further processing operation e.g. it is positioned on a bending mold and passed through a heated bending lehr.

SUMMARY OF THE INVENTION

In accordance with the preferred form of the present invention a system has been provided wherein the glass loading means, the glass scoring means and the glass breakout means have been "twinned." That is, each one of these components appears on the conveyor line in duplicate. Disposed along the conveyor line there is provided firstly, a loading station for removing rectangular sheets of glass of one predetermined outline size from a first storage means or pallet or from a second storage means containing glass of a different predetermined size. Just beyond the loading station are serially arranged first and second scoring stations and beyond these are located serially arranged first and second breakout stations. The first scoring and breakout stations are arranged to score to a first outline pattern and breakout, respectively, glass from the first pallet while the second scoring and breakout stations are arranged to score to a second outline pattern and breakout, respectively, glass received from the second pallet.

By providing for twin loading, cutting and breakout stations in the production line as indicated above, the manufacturer is able to effect pattern changes on the second scoring station and the second breakout station, for example, while continuing to operate utilizing the first scoring and breakout stations and vice versa. This eliminates the need for shutting down the production line when pattern changes are desired as with prior art systems employing a single scoring station and a single breakout station. Conversion from the first unloading scoring and breakout stations to the second loading scoring and breakout stations can be made while the system is in operation with absolutely no wasted production time. The same principle should also permit continual production of one glass pattern on one set of stations, e.g., the first scoring and breakout stations, while a station suffering a breakdown, e.g., the second scoring or breakout station is repaired, in many circumstances.

BRIEF DESCRIPTION OF THE DRAWINGS

The invention will be better understood with reference to the accompanying description of the preferred embodiment wherein reference is made to the drawings wherein:

FIGS. 2A, 2B and 2C comprise a plan view of a glass loading, scoring and breakout line illustrating in more detail the actual structure of the equipment;

DESCRIPTION OF THE PREFERRED EMBODIMENT

Figure 1:
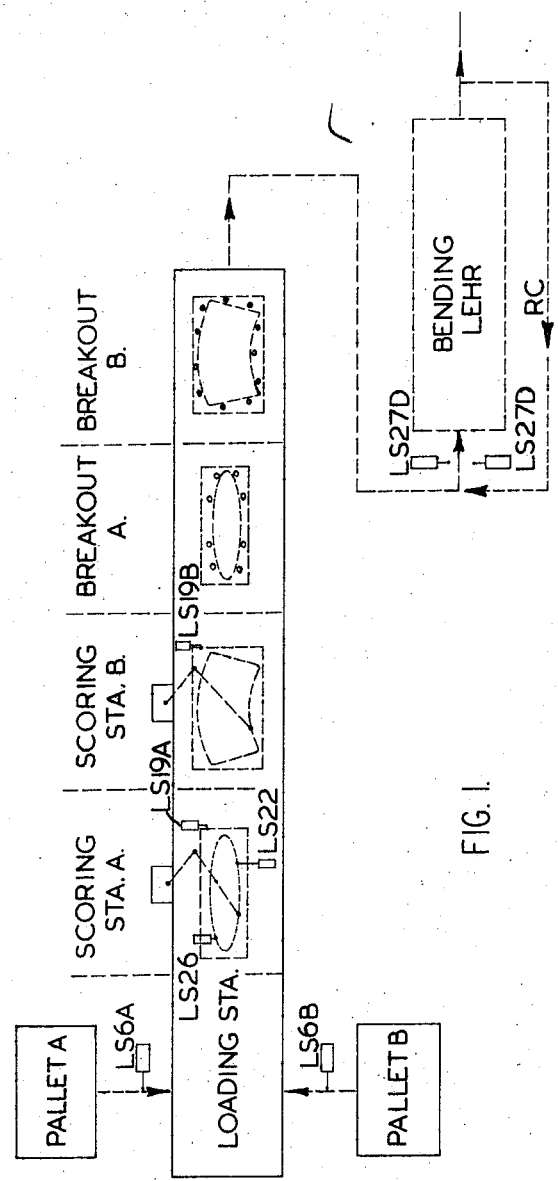
FIG. 1 is a diagrammatic plan view of a glass loading, scoring, and breakout line incorporating the principles of the present invention.

Referring now to the drawings, FIGS. 1 through 4, it will be seen that the loading, scoring and breakout assembly includes an elongated conveyor system 10 which includes an elongated support table 12 constructed so as to give the arrangement the necessary overall strength and stability. Mounted adjacent opposing ends of the conveyor line are conveyor rolls 14 and 16 around both of which passes an endless flexible conveyor belt 18 of a width substantially the same width as the rolls 14 and 16. The upper run of the conveyor belt 18 is supported on the table-like surface provided by table 12 while the lower run of conveyor belt 18 is supported on spaced apart guide rollers 20. The conveyor belt 18 is driven in step-by-step fashion by a main drive motor 22 via suitable control circuitry to be mentioned hereinafter.

Figure 2B:
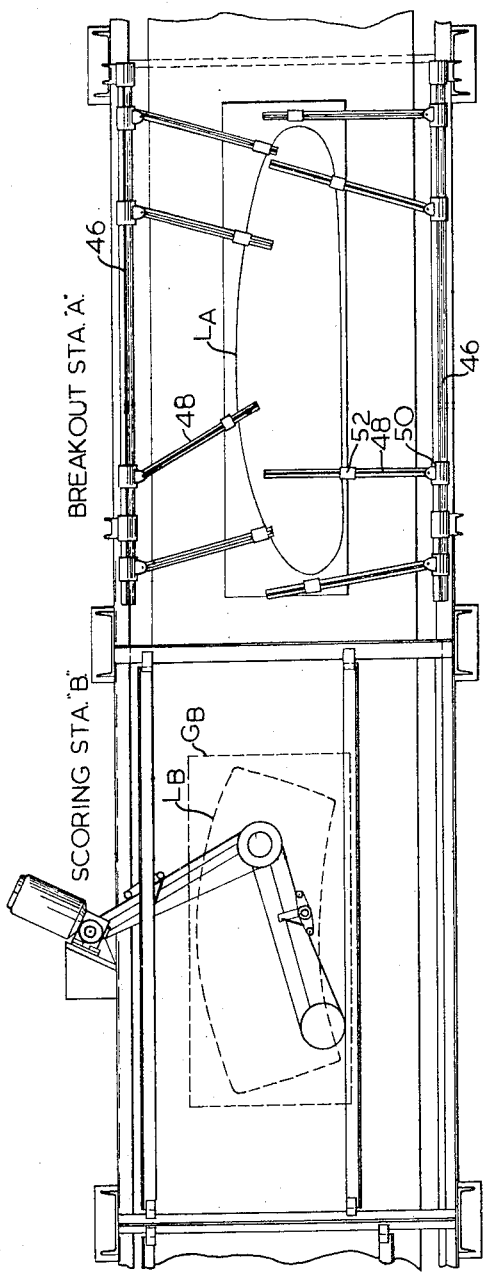
Figure 2C:
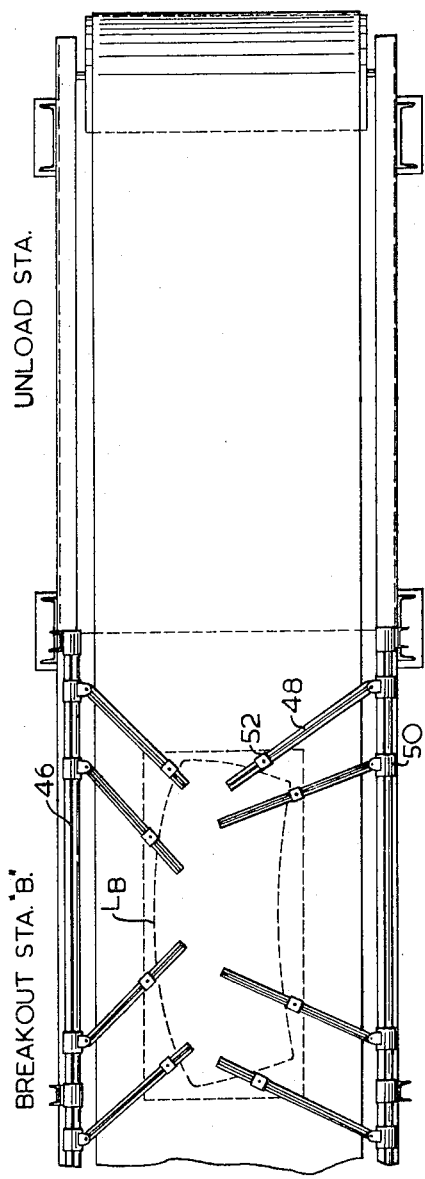
Figure 3A:
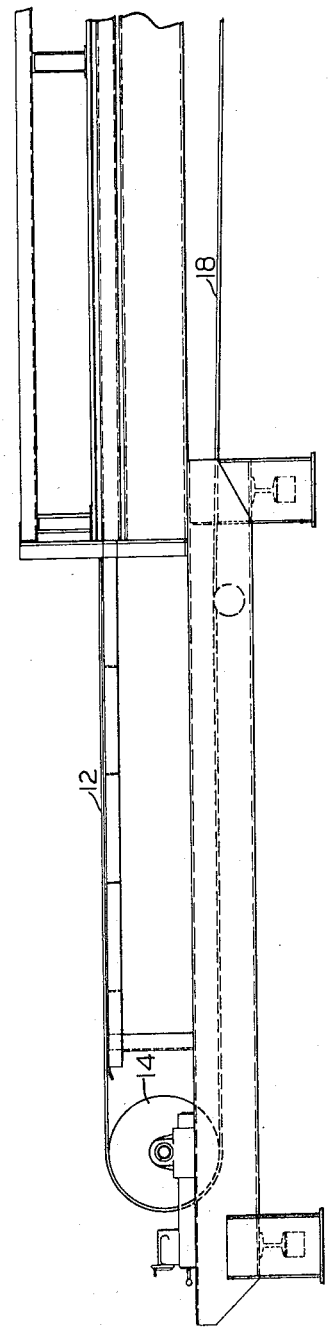
FIGS. 3A, 3B and 3C comprise a side elevation view of the equipment shown in FIGS. 2A, 2B and 2C.
Figure 3B:
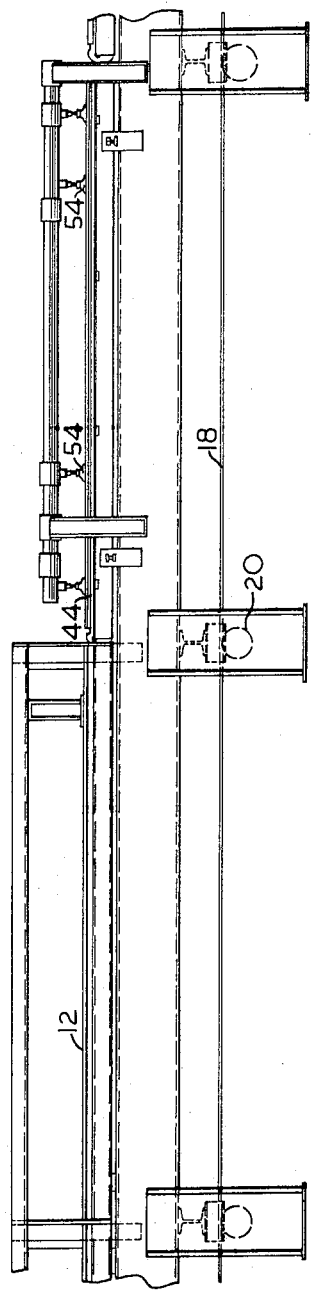
Figure 3C:
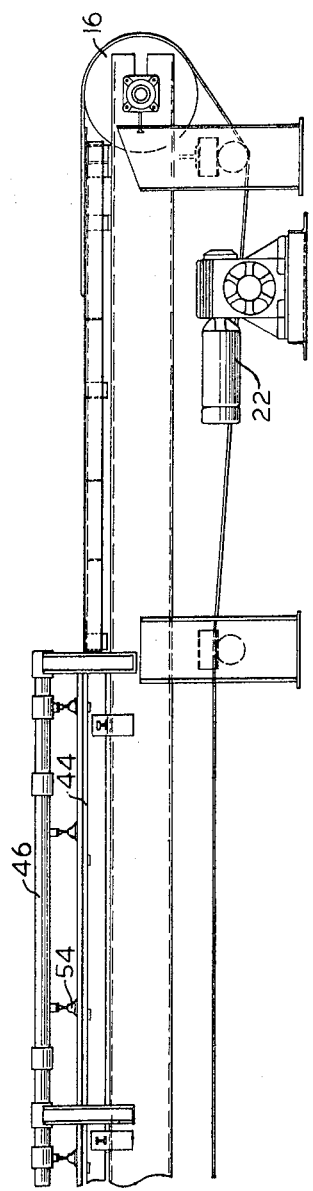

As best seen in FIGS. 1 and 2, the conveyor line actually consists of a plurality of serially arranged "stations." From the inlet or entrance end of the conveyor line to the exit end thereof there are provided in serially aligned relation a loading station, scoring station A, scoring station B, breakout station A and breakout station B and an unloading station.

Dealing firstly with the loading station it will be seen that there has been provided a glass loader A and a glass loader B located on opposite sides of the conveyor line. Loader A is adapted to pick up sheets of glass of predetermined size suitable for scoring and breakout in scoring and breakout stations A while loader B is adapted to pick up sheets of a different outline size from pallet B which sheets are sized especially for use when scoring station and breakout station B are operative.

Figure 4:
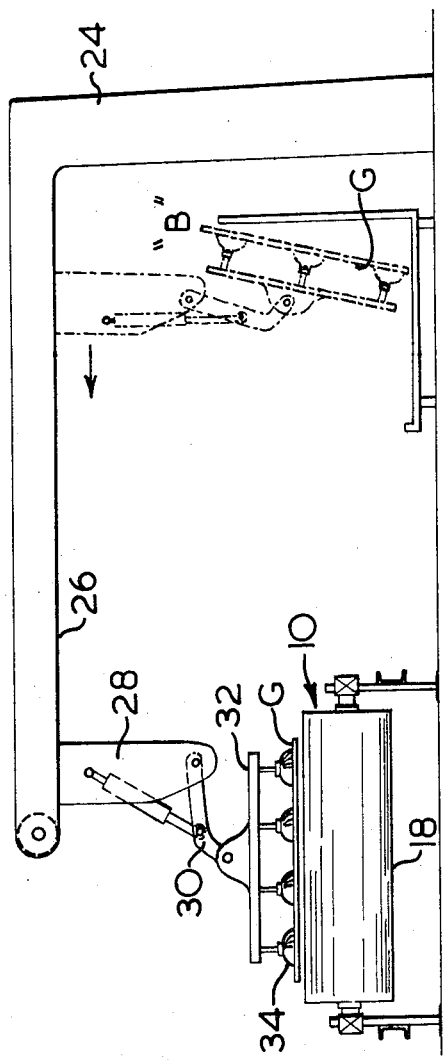
FIG. 4 is a somewhat diagrammatic end elevation view of a typical glass loader assembly for use in conjunction with the present invention.

Various forms of glass loading devices may be used in conjunction with the present invention. FIG. 4 illustrates one typical arrangement. From FIG. 4 it will be seen that the glass loader is adapted to gently remove individual sheets of glass from pallet B, to shift the glass laterally while rotating same into a horizontal plane and to thereafter gently position same on the surface of the conveyor belt 18 at the loading station. The loader includes a support frame 24 including track means 26 along which a carriage 28 may travel from a position adjacent pallet B to a position just over the loading station. Connected to carriage 28 by means of a pneumatically situated link and lever system 30 is a plate-like support 32 carrying a series of vacuum cups 34, the glass engaging surfaces of which are made of a resilient material. A suitable control system (not shown) including limit switches, electrical relays, solenoid valves cause the loader to function in a continuous and automatic fashion to effect transfer of the glass sheets individually from the pallet to the loading station as mentioned briefly above. Since glass loaders of the same general nature as shown above have been in use for many years as evidenced by U.S. Pat. No. 3,094,322 to F.W. Kocher and O.R. Rinne issued June 18, 1963, and are generally well known to those skilled in the art, a further more detailed description is not necessary here.

Turning now to the scoring stations A and B, it will be seen that these are substantially identical to one another in structure with the exception that they are adapted to provide score lines of differing outline patterns on the glass sheets. With reference to scoring station A it will be seen that there is positioned thereon a somewhat elongated but relatively narrow sheet $G_a$; this sheet includes a score line $L_a$ thereon. Turning then to scoring station B it will be seen, purely for purposes of illustration, that this station is adapted to handle glass sheets $G_b$ which are relatively short and wide as compared with those of station A with a score line $L_b$ which is considerably different in configuration from that shown in respect of station A. It will of course be appreciated that the outline shapes for the glass sheets and the score lines thereon are purely illustrative and that they may be varied at will depending on the end use of the glass product. It should also be noted here that during operation of the loading, scoring and breakout assembly that all stations along the conveyor line will normally be filled with glass of one size, i.e., all stations will normally be occupied by glass from either pallet A or pallet B. Hence, the outline shapes shown in scoring station B and breakout station B have been shown in dashed lines since glass sheets of this outline shape do not, under ordinary circumstances, occupy these positions when scoring station A and breakout station A have glass therein taken from pallet A. Therefore, the outline shapes shown at scoring station B and breakout station B should be taken only as illustrating the fact that these two stations are capable of scoring and breaking out glass of significantly different outline pattern from that scored and broken out in stations A.

The apparatus used at scoring stations A and B to effect scoring of the glass is generally very well known in the art and will not be described in detail here. Basically, each scoring device comprises an articulated arm assembly 40 which carries a scoring head 42 thereon. This articulated arm is caused to swing in a closed path by virtue of a fixed cam (not shown) having the same outline shape as the outline shape of the score line to be placed on the glass sheet. The scoring head 42 will include a suitable cutting element, the latter being capable of being withdrawn into the scoring head by suitable pneumatic control means or the like (not shown). Scoring stations A and B will thus be seen to be identical except for the fact that the outline shapes of their respective scoring head guiding cams are different thereby to provide a differing score line outline as best illustrated in FIG. 2. The mechanisms at scoring station A and B are of course controlled by suitable limit switches, relays etc. which are not shown here since they form a part of the prior art as evidenced by U.S. Pat. No. 3,537,345 to A. Luppino issued Nov. 3, 1970.

Breakout stations A and B are also identical in structure, the only difference in configuration between them being due to the fact that they are designed to break out glass sheets having the different score line patterns imparted thereto at scoring stations A and B. While various forms of breakout station structure could be used in conjunction with the present invention, the structure illustrated has been found to be particularly advantageous in permitting a very rapid changeover from one pattern to another and hence it will be described in somewhat more detail than the remaining parts of the system.

Since the breakout stations are identical, except as noted above, only one of them need be described. Extending throughout the length and breadth of each breakout station is a relatively thick rubber pad 44 which underlies the conveyor belt 18. This rubber pad is designed to enhance the breakout action provided by the structure to be hereinafter described.

Supported above the conveyor belt and extending parallel to the longitudinal axis of same are spaced parallel support tubes 46 to which a plurality of arms 48 are connected by means of adjustable brackets 50 which permit arms 48 to be shifted along tubes 46 as well as permitting such arms to be adjusted angularly in a horizontal plane. Each arm 48 carries a small pneumatic cylinder 52 with each of the latter carrying a downwardly depending presser foot 54 (FIG. 3) adapted to come into engagement with the surface of the glass sheets. These pneumatic cylinders 52 may be adjusted inwardly or outwardly along the respective arms 48 and locked in any desirable position.

In the operation of the breakout stations the sheets of glass are indexed by the conveyor belt 18 to a preselected position below the arms 48 and their associated cylinders 52 as shown in FIG. 2. The various arms 48 had, prior to this time, been adjusted in conjunction with their respective pneumatic cylinders 52 to positions such that the various presser feet 54 are capable of engaging the glass sheet immediately outwardly of the score line L which was previously applied to the glass sheet at the scoring station. As seen in FIG. 2, the arms 48 at breakout station A and their respective cylinders 52 have been adjusted so that the presser feet 54 can contact the glass sheet just outside of the score line $L_a$. In breakout station B the arms 48 and cylinder 52 have been adjusted such that the presser feet can contact the glass sheet just outside score line $L_b$.

Suitable control devices (not shown) apply air pressure to cylinders 22 in a predetermined sequence thereby to cause their associated presser feet to engage the margins of the glass thus applying a bending moment to same which effects severing of the sheet all along the score line. This severing action is enhanced by virtue of the relatively thick rubber pad underlying the conveyor belt as mentioned above because such rubber pad deforms under the influence of the pressure applied by presser feet 54. To further enhance the severing action, the support surfaces over which the relatively thick rubber pad 44 lies may be made such that the surface of the latter has a slightly convex configuration when seen in a section view taken transverse to the longitudinal axis of the conveyor line.

After a short time interval sufficient to permit the glass to be severed all along the score line, the air pressure is released, the presser feet 54 retract and the conveyor belt again indexes one station to carry the sheet, which has been severed, to the unloading station where the glass sheet is separated from the cullet or scrap glass which has been removed by virtue of the scoring and breaking action described previously.

The overall structure of the "twined" loading, scoring and breakout station assembly has been described. Reference will now be had to the operation of this system.

In the above described assembly, it is a relatively simple matter to provide suitable circuitry for controlling and operating the loader, the cutting and breakout stations in timed relation to one another during those periods of time when glass sheets are being removed from one pallet, e.g., pallet A, and are being scored and broken out in scoring and breakout stations A as described above. However, during the process of converting from loading, scoring and breakout stations A to loading, scoring and breakout stations B, and vice versa, action must be taken to avoid preforming any operations on any of the A stations on glass sheets which have come from pallet B and vice versa. In other words, provision must be made to ensure that, during changeover from glass A to glass B, that all glass from pallet A has been cleared through scoring and breakout stations B before operations on these stations commence.

A review of Table 1 will be of assistance in understanding the operation of the invention. Each box indicates the origin of the glass in each station of the equipment and the presence of an X in any box indicates that an operation is being performed on such glass at that station (an X appears whenever an A glass appears in an A scoring or breakout station for example). From one horizontal row to the next the conveyor belt has indexed the glass sheets one station.

TABLE 1

| | Loading Sta. | Score A | Score B | Break-out A | Break-out B |
|---|---|---|---|---|---|
| Normal Operation From Pallet A | A | Ax | A | Ax | A |
| Transition From A-B 1. | B | Ax | A | Ax | A |
| 2. | B | B | A | Ax | A |
| 3. | B | B | Bx | Ax | A |
| 4. | B | B | Bx | B | A |
| Normal Operation From Pallet B 5. | B | B | Bx | B | Bx |
| Transition 1. | A | B | Bx | B | Bx |
| 2. | A | Ax | Bx | B | Bx |
| sition B A 3. | A | Ax | A | B | Bx |
| 4. | A | Ax | A | Ax | Bx |
| Normal Operation From Pallet A 5. | A | Ax | A | Ax | A |

By way of example, during normal operation with sheets from pallet A, all stations have glass therein from pallet A with scoring and breakout stations A in operation. Then, during transition from A to B, stage 1, a glass from pallet B is placed on the conveyor at the loading station. In stage 2 the conveyor has indexed one station and only breakout station A is operative. In stage 3 scoring station B and breakout station A operate while in stage 4 only scoring station B is in operation. Stage 5 represents normal operation using glass from pallet B with all stations containing glass from the latter and scoring and breakout stations B in operation. Transition from B back to A involves the placement of a sheet of glass from pallet A on the conveyor at the loading station. The conveyor belt then successively moves this glass through the various stations as before until all stations have glass therein from pallet A, with scoring and breakout stations A in operation.

The operation of the system will now be described with particular reference to certain of the control means involved when transferring from loading, scoring and breakout stations A to loading, scoring and breakout stations B respectively and vice versa.

In changing from stations A to stations B, various systems for initiating the changeover can be used. However, in this case, it has been found convenient to provide a pair of limit switches at the entrance to the bending lehr which receives the glass sheets produced by the apparatus described above. Provision can be made for a predetermined mold to contact one of these limit switches to initiate transfer from stations A to stations B. Provision can be made for another mold to initiate transfer back from stations B to stations A.

In operation, it will be assumed that the system is operating on loading, scoring and breakout stations A. The loading system A (which is simply a mirror image of the loading system B shown in FIG. 4) continues to pick glass from pallet A until a predetermined mold carrying glass which has been scored and broken out at stations A, being loaded at the glass bending lehr, contacts one half of limit switch LS–27D, the latter being located at the entrance to a bending lehr as shown schematically in FIG. 1.

Figure 5:
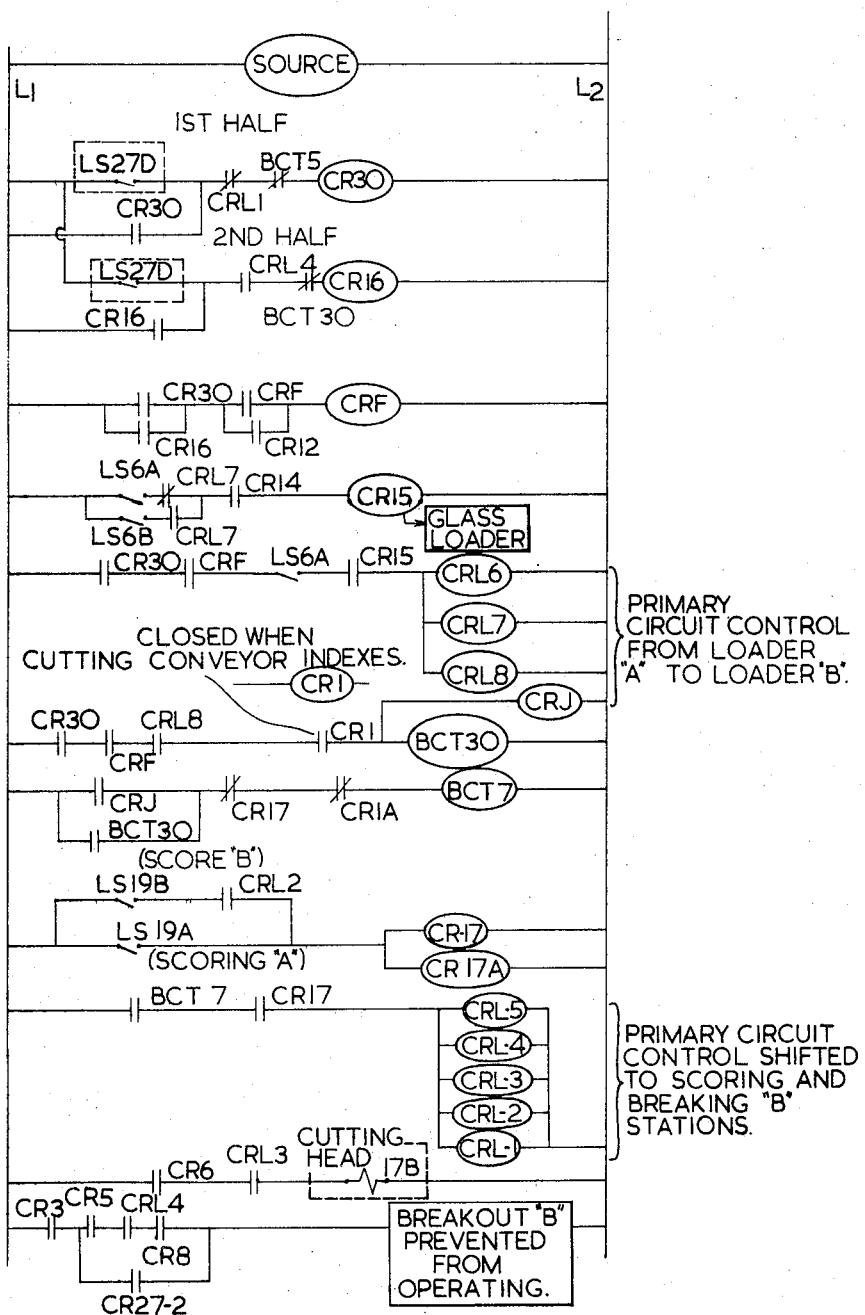
FIGS. 5, 6 and 7 are schematic diagrams of portions of the control circuitry for operating the glass loading, scoring and breakout station assemblies.
Figure 6:
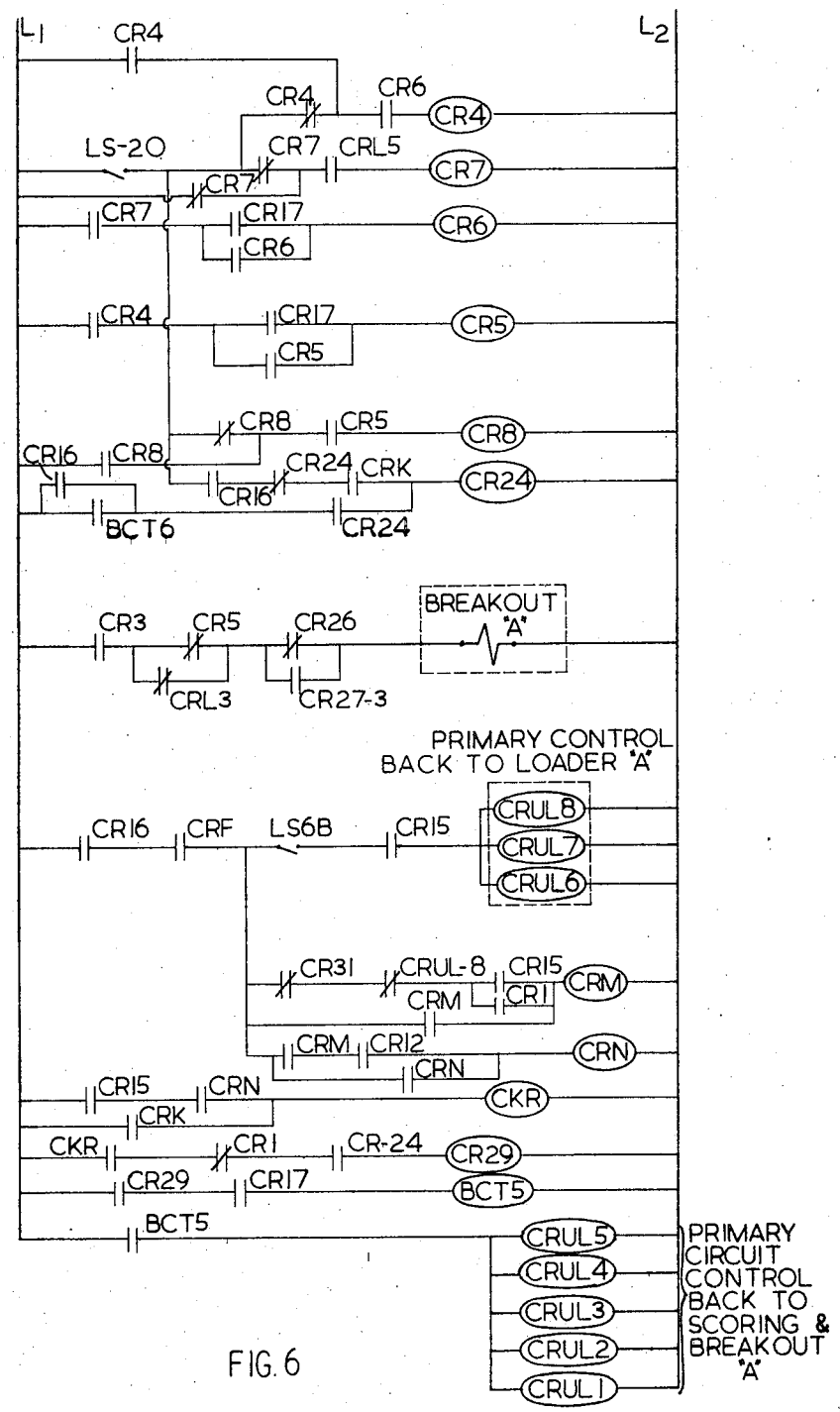
Figure 7:
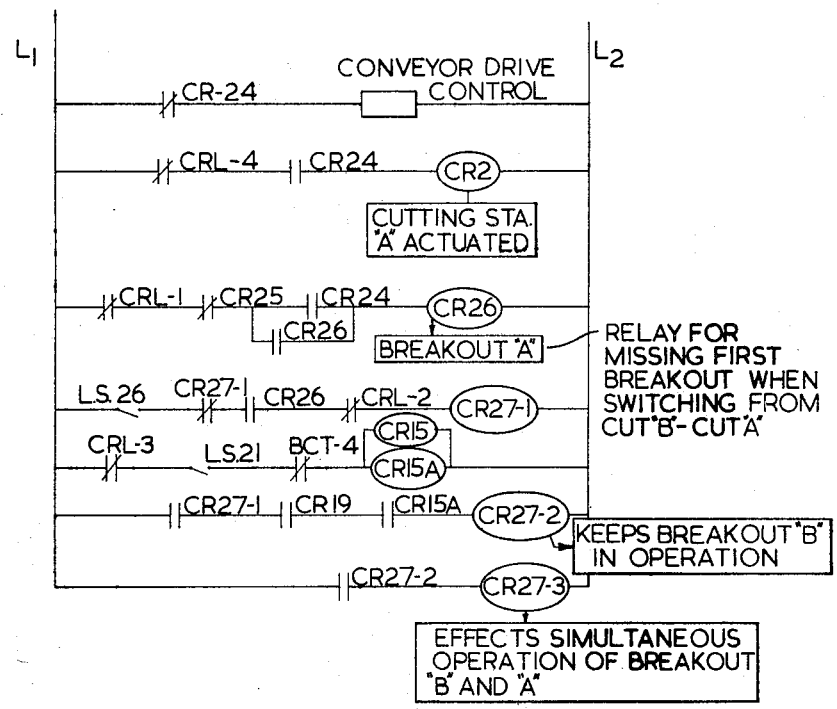

With reference to FIGS. 5–7, at this time time relay CR–30 is energized. At this point, glass loader A is positioned over the loading station depositing glass from pallet A on conveyor belt 18. Normally open contact CR–30, now closed, energizes relay CRF. With normally open contacts CR–30 and CRF now closed and loader A moving to pick up another sheet of glass from pallet A, limit switch LS–6A located in a suitable position on loader A is contacted. One-half of LS–6A, when contacted, energizes relay CR–15 through the normally open contacts of CR–14, which at this time are closed because relay CR-14 is energized, in order, via suitably circuitry, not shown, to make the loader again move towards pallet A to pick up another sheet of glass. The other half of limit switch LS-6A, through normally open contacts CR-30, CRF and CR-15, which at this time are all closed, energizes mechanically held latching relays CRL-6, CRL-7 and CRL-8. With initiation and mechanical holding of latch relays CRL-6, CRL-7 and CRL-8 primary circuit control is shifted from mechanical loader A for picking glass from pallet A to mechanical loader B picking glass from pallet B.

At this time it should be noted that all index stations on the conveyor line contain glass which originally came from pallet A.

With normally open contacts CR-30 and CRF closed and normally open contacts CRL-8 now closed, when the conveyor indexes one station, CR-1 contacts will close thus energizing relays CRJ and BCT-30. With CRJ and BCT-30 contacts now closed, and scoring station A now operative to score the last glass received from pallet A, relay BCT-7 is now energized. With the scoring arm A in the home position contacting LS-19-A energization of relays CR-17 and CR-17-A is effected. This effects closure of normally open contacts BCT-7 and CR-17 thus energizing mechanically held latch relays CRL-1, CRL-2, CRL-3, CRL-4 and CRL-5. With initiating and mechanical holding of these latch relays, primary circuit control is shifted over to scoring and breakout stations B.

When the conveyor belt 18 indexes this time it moves a previously scored glass from station A to station B in both the scoring and breakout stations. Hence, when scoring station B commences its first operation, normally open contact CR-6 prevents air solenoid 17-B (which effects actuation of the scoring head B) from energizing and re-scoring the glass, which was already scored at station A, to the wrong pattern.

After scoring station B has been activated, it takes three indexing movements of the conveyor line to clear breakout station B of glass which originally came from pallet A. This means that during changeover operations breakout station A must continue to operate until all glass originating from pallet A has been cleared therethrough. During this time normally open contacts CR-8 prevent the breakout station B from operating and possibly breaking glass scored at station A.

When scoring arm B makes its first circuit around the pattern, limit switch LS-20 is contacted and with CRL-5 contacts now closed, relay CR-7 is energized. When scoring arm B reaches its home position it contacts LS-19-B and with contacts CRL-2 now closed, relays CR-17 and CR-17-A are again closed. With normally open contact CR-7 and CR-17 now closed, relays CR-6 is now energized thus closing normally open contacts CR-6 and permitting solenoid 17-B to supply air pressure to the scoring head of the cutter arm at station B, thus rendering the latter effective to score glass. With normally open contact CR-6 now closed and the scoring arm making its second turn around the pattern and again contacting switch LS-20, relay CR-4 is now energized. When the scoring arm B again reaches its home position, energizing relays CR-17 and CR-17-A, with normally open contacts CR-4 and CR-17 now closed, relay CR-5 is energized.

When scoring arm B makes its third turn around the pattern and again contacts switch LS-20, and with normally open contact CR-5 now closed, relay CR-8 is then energized thus closing normally open contacts CR-8 and permitting operation of breakout station B. During the time that transfer from breakout station A to breakout station B is taking place, normally closed contacts CR-5 keep breakout station A in operation until all sheets scored at station A have been passed therethrough. Changeover from pattern A to pattern B is now complete and the system will continue to load sheets on the conveyor from pallet B and to index them in step-by-step fashion down the conveyor line, scoring same at scoring station B and breaking them out at breakout station B while scoring and breakout stations A are held inoperative.

The operations involved in transferring back to loading station A, scoring station A and breakout station A will now be described.

The system will now continue to operate from pallet B scoring station B and breakout station B until another predetermined mold containing glass cut to pattern B, being loaded at the bending lehr, contacts the other half of limit switch LS-27D. With contact CRL-4 now closed, relay CR-16 will be energized. Relay CRF will then be energized in the same manner as before but through contacts CR-16. In the same manner as before, but with loader arrangement B on its way to pick up another sheet of glass from pallet B, the switch LS-6B will be engaged thus effecting, with relay contacts CR-16 and CRF now closed, energization of relays CRUL-6, CRUL-7 and CRUL-8. These relays remove the mechanical holding on latch relays CRL-6, CRL-7 and CRL-8 thereby letting the relays return to their deenergized state and switching primary control back to mechanical loader A.

At this time, it will be appreciated that all index stations along the conveyor line contain glass originally received from pallet B.

With relay contacts CR-16 and CRF now closed and contact CR-15 also closed and loader A moving to pick up glass from pallet A, relay CRM will be energized. This closes contact CRM, and, with loader A over the conveyor ready to deposit glass thereon from pallet A, contacts CR-12 will be closed thus energizing the relay CRN. With relay contact CRN closed and loader A returning to the pallet for another glass sheet, relay contact CR-15 is closed, energizing relay CRK. Now that contacts CR-16 and CRK are closed, when the scoring arm at station B contacts switch LS-20, relay CR-24 is energized. With normally open contact CRK and CR-24 now closed and the conveyor belt stopped, relay CR-29 becomes energized. When the scoring arm at station B comes to its home position, CR-17 contacts become closed and, with contact CR-29 already closed, relay BCT-5 is energized thus closing BCT-5 contacts and energizing relays CRUL-1, CRUL-2, CRUL-3, CRUL-4 and CRUL-5. These relays remove the mechanical holding on latch relays CRL-1, CRL-2, CRL-3, CRL-4 and CRL-5 thereby letting these relays return to their deenergized state and switching primary control back to scoring station A and breakout station A. At the time of this changeover it will be appreciated that there is already a glass from pallet A in scoring station A so therefore scoring station A must be operated to score this glass before the conveyor line is again indexed. Normally closed contact CR-24 now opens thus preventing the conveyor from indexing to the next position with normally open contact CR-24 now closed and with the closing of CRL-4, relay CR-2 is energized thus initiating operation of scoring arm A thereby scoring the glass sheet.

At this time there are still two sheets of glass, scored to pattern B, still to be broken out in breakout station B. Thus, it is essential that breakout station A be held inoperative until these two sheets have been cleared through breakout B.

With normally open contact CR-24 now closed and with the closing of CRL-1, relay CR-26 is energized thus preventing breakout station A from operating on the first conveyor station index and avoiding damage to glass scored at scoring station B.

With normally open contact CR-26 now closed and CRL-2 now in closed position, when scoring arm at station A makes its first turn around the pattern, limit switch LS-26 is contacted and energizes relay CR-27-1. With normally open contact CR-27-1 now closed and normally open contact CR-19 closed because of the indexing movement of the conveyor, and normally open contact CR-15-A closed while scoring station A is scoring the glass, relay CR-27-2 will be energized. With normally open contact CR-27-2 now closed, breakout station B is kept in operation. At the end of the next conveyor indexing movement and at the start of operation of scoring station A, with contact CR-27-2 now closed, relay CR-27-3 is then energized. The closing of these contacts operate breakout station A with breakout station B simultaneously. On the next conveyor index breakout station B is then cleared of all glass originating from pallet B.

A system will now continue to operate will all primary control operating glass loader A, scoring and breakout stations A until transfer back again to stations B takes place.

Although a specific embodiment of the invention has been described those skilled in the art will realize that other various modifications can be made to the disclosed system within the confines of the invention. Those skilled in the art will be able to devise other suitable forms of control systems for use in the invention.

We claim:

1. In the method of scoring and severing glass sheets to predetermined outline shapes wherein first and second scoring stations are provided along a conveyor line for scoring glass sheets to first or second outline patterns with first and second glass breakout stations being provided on said conveyor line downstream of said first and second scoring stations to effect severing or breakout of glass sheets scored at said first or second scoring stations respectively, the steps of sequentially scoring a plurality of sheets at the first scoring station while advancing said sheets in step-by-step fashion through said second scoring station while the latter is held inoperative and sequentially severing the sheets along their score lines at the first glass breakout station, and, after a desired number of glass sheets have been scored and severed at said first scoring and breakout stations, commencing to score glass sheets at said second scoring station and to effect breakout of said scored sheets at said second breakout station.

2. A method as defined in claim 1 wherein said second breakout station is held inoperative after commencement of scoring at said second scoring station until the last sheet scored at said first scoring station has passes therethrough, said second scoring station being held inoperative until the last glass sheet scored at said first scoring station has passed therethrough.

3. The method as defined in claim 2 including subsequently progressively rendering said second scoring and breakout stations inoperative and commencing operation of said first scoring and breakout stations, wherein operation of said second breakout station continues until the last glass scored at said second scoring station has passed therethrough with the first breakout station remaining inoperative until the first sheet scored at the first scoring station has been received therein.

4. The method of claim 1 wherein the glass sheets utilized for scoring and severing at said first and second scoring and breakout stations are of predetermined first and second dimensions.

5. The method of claim 2 wherein a glass loading station is provided in advance of the first scoring station with loading apparatus for transferring glass of either a first or a second predetermined size from first or second glass storage positions respectively to said conveyor line, and wherein the first scoring station continues to score glass until the first sheet originating from said second glass storage position has been received therein with said first scoring station then being rendered inoperative to avoid scoring glass from said second storage position to said first outline pattern.

6. The method of claim 3 wherein a glass loading station is provided in advance of the first scoring station with loading apparatus for transferring glass of either a first or a second predetermined size from first or second glass storage positions respectively to said conveyor line, and wherein the first scoring station remains inoperative until the last sheet received from the second storage position has passed therethrough, the first and second breakout stations being operated substantially simultaneously after the first sheet from the first sheet storage position has been received in the first breakout station.

7. Apparatus for scoring and severing glass sheets to predetermined outline shapes comprising; a conveyor line, first and second scoring stations disposed along said conveyor for scoring glass sheets to first and second outline patterns respectively, and first and second glass breakout stations provided on said conveyor line downstream of said first and second stations to effect breakout of glass sheets scored at said first and second scoring stations respectively, means to sequentially score a plurality of glass sheets at said first scoring station while said second scoring station is held inoperative, and means to sequentially sever said sheets along their score lines at said first glass breakout station while said second breakout station is held inoperative, and means effective to cause discontinuance of scoring and severing of said glass sheets at said first scoring and breakout stations and to effect commencement of scoring of glass sheets at said second scoring station and to effect breakout of said scored sheets at said second breakout station.

8. Apparatus as defined in claim 7 including means to hold said second breakout station inoperative after commencement of scoring at said second scoring station until the last sheet scored at said first scoring station has passed therethrough, and means effective to hold said second scoring station inoperative until the last sheet scored at said first scoring station has passed therethrough.

9. Apparatus as defined in claim 8 including further means for progressively rendering said second scoring and breakout stations inoperative and initiating operation of said first scoring and breakout stations, and means to effect continuation of operation of said second breakout station until the last sheet scored at said second scoring station has passed therethrough, means to hold the first breakout station inoperative until the first sheet scored at the first scoring station has been received therein.

* * * * *

UNITED STATES PATENT OFFICE
CERTIFICATE OF CORRECTION

Patent No. 3,717,290  Dated February 20, 1973

Inventor(s) William Bentley; John D. Kellar

It is certified that error appears in the above-identified patent and that said Letters Patent are hereby corrected as shown below:

Column 10, claim 2, line 5, after "has" delete "passes" and insert --passed--

Signed and sealed this 27th day of November 1973.

(SEAL)
Attest:

EDWARD M. FLETCHER, JR.  RENE D. TEGTMEYER
Attesting Officer  Acting Commissioner of Patents